United States Patent
Sandy

(10) Patent No.: US 8,989,673 B2
(45) Date of Patent: Mar. 24, 2015

(54) SYSTEM FOR DELIVERING DATA TO USERS

(71) Applicant: Medea Inc., Pleasanton, CA (US)

(72) Inventor: Matt Sandy, New York, NY (US)

(73) Assignee: Medea Inc., Pleasanton, CA (US)

( * ) Notice: Subject to any disclaimer, the term of this patent is extended or adjusted under 35 U.S.C. 154(b) by 187 days.

(21) Appl. No.: 13/630,033

(22) Filed: Sep. 28, 2012

(65) Prior Publication Data

US 2014/0094126 A1 Apr. 3, 2014

(51) Int. Cl.
*G06Q 30/00* (2012.01)
*B65D 85/00* (2006.01)

(52) U.S. Cl.
USPC ...... 455/66.1; 455/41.3; 705/26.1; 206/459.1

(58) Field of Classification Search
None
See application file for complete search history.

(56) References Cited

U.S. PATENT DOCUMENTS

| | | |
|---|---|---|
| 97,669 A | 12/1869 | Millen |
| D20,656 S | 3/1891 | Dawes |
| D23,100 S | 3/1894 | Fay et al. |
| 716,793 A | 12/1902 | Vogeler |
| 823,008 A | 6/1906 | Vendig |
| 1,262,788 A | 4/1918 | Heidenreich |
| 1,554,191 A | 9/1925 | Alexander |
| 1,653,608 A | 3/1927 | Allen |
| 1,686,354 A | 3/1927 | Wallace |
| 1,769,147 A | 12/1927 | Benjamin |
| D79,958 S | 11/1929 | De Wagner |
| 1,770,093 A | 7/1930 | West |
| D85,487 S | 7/1931 | Meyer |
| 1,856,550 A | 5/1932 | Guenard |
| 3,864,976 A | 2/1975 | Parker |
| 3,965,590 A | 6/1976 | Algaze |
| 3,996,879 A | 12/1976 | Walton |
| 4,607,756 A | 8/1986 | Courtman |
| D285,903 S | 9/1986 | Courtman |
| 4,765,465 A | 8/1988 | Yamada et al. |
| 4,928,412 A | 5/1990 | Nishiyama |
| D314,308 S | 2/1991 | Cogswell |
| D317,123 S | 5/1991 | Colani |
| D318,224 S | 7/1991 | Altobelli |
| 5,125,866 A | 6/1992 | Arad et al. |
| 5,168,646 A | 12/1992 | Dippong et al. |
| 5,201,431 A | 4/1993 | Berger et al. |

(Continued)

FOREIGN PATENT DOCUMENTS

| | | |
|---|---|---|
| JP | 07-027624 | 1/1995 |
| WO | WO 03/099039 | 12/2003 |
| WO | WO 2010/138107 | 12/2010 |

OTHER PUBLICATIONS

Tech-Recipes, http://www.tech-recipes.com/rx/2484/iphone_change_the_auto_lock_delay/, Jun. 29, 2007.

(Continued)

*Primary Examiner* — Ping Hsieh
*Assistant Examiner* — James Yang
(74) *Attorney, Agent, or Firm* — Lowenstein Sandler LLP

(57) ABSTRACT

A system for delivering data to a user includes a beverage container provided with an electronic device having an electronic display, and a portable electronic apparatus such as an electronic mobile phone or an electronic tablet, so that a user operates the portable electronic apparatus to compose data, which are transmitted via ultra-sound to the beverage container and displayed on its electronic display.

4 Claims, 1 Drawing Sheet

(56) References Cited

U.S. PATENT DOCUMENTS

| | | | |
|---|---|---|---|
| 5,211,699 A | 5/1993 | Tipton | |
| 5,297,247 A | 3/1994 | Kan | |
| 5,339,548 A | 8/1994 | Russell | |
| 5,379,916 A | 1/1995 | Martindale et al. | |
| 5,553,735 A | 9/1996 | Kimura | |
| 5,575,553 A | 11/1996 | Tipton | |
| 5,678,925 A | 10/1997 | Garmaise et al. | |
| 5,774,876 A | 6/1998 | Woolley et al. | |
| 5,823,346 A | 10/1998 | Weiner | |
| 5,863,752 A | 1/1999 | Court et al. | |
| 5,884,421 A | 3/1999 | Key | |
| 5,992,678 A | 11/1999 | Willey | |
| 6,037,872 A | 3/2000 | Dunnum | |
| 6,062,380 A | 5/2000 | Dorney | |
| 6,084,526 A | 7/2000 | Blotky et al. | |
| 6,158,870 A | 12/2000 | Ramirez | |
| D436,852 S | 1/2001 | Chan | |
| 6,213,616 B1 | 4/2001 | Chien | |
| 6,302,608 B1 | 10/2001 | Holmes et al. | |
| 6,393,401 B1 | 5/2002 | Loudermilk et al. | |
| D470,770 S | 2/2003 | Machado et al. | |
| 6,527,402 B1 | 3/2003 | Borri | |
| D473,469 S | 4/2003 | Claessen | |
| 6,588,131 B2 | 7/2003 | O'Connell, Jr. | |
| 6,588,593 B2 | 7/2003 | Woskoski | |
| 6,747,918 B2 | 6/2004 | Hight et al. | |
| 6,762,734 B2 | 7/2004 | Blotky et al. | |
| 6,872,116 B1 | 3/2005 | Dunnum et al. | |
| 6,923,549 B2 | 8/2005 | Hoy | |
| 6,945,418 B2 | 9/2005 | Guido et al. | |
| 7,000,343 B1 | 2/2006 | Teichman | |
| D521,388 S | 5/2006 | Andoh | |
| D521,389 S | 5/2006 | Andoh | |
| D522,865 S | 6/2006 | Andoh | |
| D523,346 S | 6/2006 | Andoh | |
| 7,152,832 B2 | 12/2006 | Wochnick | |
| 7,163,311 B2 | 1/2007 | Kramer | |
| 7,300,171 B2 | 11/2007 | Sutton | |
| D571,153 S | 6/2008 | Lopez | |
| 7,383,650 B2 | 6/2008 | Duesler | |
| D574,249 S | 8/2008 | Seum et al. | |
| D575,583 S | 8/2008 | Morgan | |
| 7,413,082 B2 | 8/2008 | Adler et al. | |
| D596,037 S | 7/2009 | Slubski | |
| 7,690,533 B2 | 4/2010 | Stilley | |
| D617,200 S | 6/2010 | Goldburt | |
| 7,824,051 B2 | 11/2010 | Walter et al. | |
| 7,837,333 B2 | 11/2010 | Chou et al. | |
| 7,934,845 B2 | 5/2011 | Yang | |
| 7,954,970 B2 | 6/2011 | Goldburt | |
| 8,056,273 B2 | 11/2011 | Goldburt | |
| 8,123,033 B2 | 2/2012 | Goldburt | |
| 8,232,981 B2 | 7/2012 | Sandy | |
| 2002/0097195 A1 | 7/2002 | Frank | |
| 2002/0104848 A1 | 8/2002 | Burrows et al. | |
| 2002/0126150 A1 | 9/2002 | Parry | |
| 2002/0190869 A1 | 12/2002 | Blotky et al. | |
| 2003/0099158 A1 | 5/2003 | De la Huerga | |
| 2003/0122730 A1 | 7/2003 | Frank et al. | |
| 2003/0129283 A1 | 7/2003 | Martinez Carballido | |
| 2003/0226298 A1 | 12/2003 | Bjork | |
| 2004/0004829 A1 | 1/2004 | Policappelli | |
| 2004/0026357 A1 | 2/2004 | Beck et al. | |
| 2004/0118022 A1 | 6/2004 | Duesler | |
| 2004/0140286 A1 | 7/2004 | Zoller | |
| 2004/0148117 A1 | 7/2004 | Kirshenbaum et al. | |
| 2004/0206828 A1 | 10/2004 | Harris | |
| 2005/0024858 A1 | 2/2005 | Johnson | |
| 2005/0036301 A1 | 2/2005 | Haines | |
| 2005/0134461 A1 | 6/2005 | Gelbman et al. | |
| 2005/0152392 A1 | 7/2005 | Lim et al. | |
| 2005/0193612 A1 | 9/2005 | Lowry | |
| 2005/0205437 A1 | 9/2005 | Huffman | |
| 2005/0207141 A1 | 9/2005 | Boesch et al. | |
| 2005/0229449 A1 | 10/2005 | Shepley | |
| 2006/0087831 A1 | 4/2006 | Kramer | |
| 2006/0118507 A1 | 6/2006 | Feldman | |
| 2006/0139928 A1 | 6/2006 | Griffiths et al. | |
| 2006/0202042 A1 | 9/2006 | Chu | |
| 2006/0231109 A1 | 10/2006 | Howell et al. | |
| 2007/0024465 A1 | 2/2007 | Howell et al. | |
| 2007/0069883 A1 | 3/2007 | Collier et al. | |
| 2007/0091123 A1 | 4/2007 | Akashi | |
| 2007/0158293 A1 | 7/2007 | Andreani | |
| 2007/0299778 A1 | 12/2007 | Haveson et al. | |
| 2008/0023357 A1 | 1/2008 | Whiteis | |
| 2008/0034628 A1 | 2/2008 | Schnuckle | |
| 2008/0074625 A1 | 3/2008 | Lai et al. | |
| 2008/0100469 A1 | 5/2008 | Goldburt | |
| 2008/0128300 A1 | 6/2008 | Bahar et al. | |
| 2008/0264816 A1 | 10/2008 | Yeh | |
| 2008/0296191 A1 | 12/2008 | Ransch | |
| 2008/0314861 A1 | 12/2008 | Goldburt | |
| 2008/0317906 A1 | 12/2008 | Goldburt | |
| 2008/0319876 A1* | 12/2008 | Goldburt | 705/27 |
| 2009/0293328 A1 | 12/2009 | Bull | |
| 2010/0101124 A1 | 4/2010 | Sorensen | |
| 2010/0182518 A1 | 7/2010 | Kirmse et al. | |
| 2010/0300913 A1* | 12/2010 | Goldburt | 206/459.1 |
| 2010/0300914 A1 | 12/2010 | Goldburt et al. | |
| 2011/0100852 A1 | 5/2011 | Goldburt | |
| 2011/0100853 A1 | 5/2011 | Goldburt | |
| 2011/0122120 A1 | 5/2011 | Feuilloley | |
| 2011/0155604 A1 | 6/2011 | Goldburt | |
| 2011/0303579 A1 | 12/2011 | Sanders | |
| 2012/0171963 A1* | 7/2012 | Tsfaty | 455/41.3 |
| 2012/0239470 A1 | 9/2012 | Goldburt | |
| 2013/0319892 A1 | 12/2013 | Goldburt | |

OTHER PUBLICATIONS

International Search Report from PCT/US2009/006751, mailed Aug. 17, 2010.
Written Opinion from PCT/US2009/006751, mailed Aug. 17, 2010.
International Preliminary Report on Patentability from PCT/US2009/006751, mailed Nov. 29, 2011.

* cited by examiner

SYSTEM FOR DELIVERING DATA TO USERS

BACKGROUND OF THE INVENTION

The present invention deals with systems for delivering data of various types to users.

More particularly it relates to systems for delivering data to users, which data are presented on electronic devices arranged on bottles or containers for beverages.

Systems of the above mentioned type are known and disclosed for example in U.S. patent application Ser. Nos. 11/588,494, 11/821,334, 11/821,335, 11/821,349, 12/454,862, 11/454,863, 12/590,000, 12/590,013, 12/655,442, 12/655,444 and our U.S. Pat. Nos. 7,954,970, 8,056,273, 8,123,033 and D 617 200. The above mentioned patents and patent applications disclose the system in which the data are stored in the memory of the electronic device on the bottles or containers for beverages and are just activated by a user to be exhibited, or the data are transmitted remotely from a control center to the electronic devices and are exhibited by the electronic devices where activated.

It is believed that the existing systems of the above mentioned type can be further improved.

SUMMARY OF THE INVENTION

Accordingly, it is an object of the present invention to provide a system for delivering data to a user, which is a further improvement of the existing systems of this type.

In keeping with these features and with others which will become apparent hereinafter, one feature of the present invention resides, briefly stated, in a system for delivering data to a user, which has a container for beverages provided with an electronic device including data receiving means and an electronic display for electronically displaying on said electronic display data received by said receiving means so that the data displayed on the electronic display are available to a user; and a portable electronic apparatus selected from the group consisting of an electronic mobile phone and an electronic tablet and having a user-operated electronic data providing means and electronic transmitting means which remotely transmit the data provided by the user via ultrasound to said receiving means of said electronic device of said beverage container to be displayed on the electronic display.

In accordance with another feature of the present invention said transmitting means and said receiving means are ultrasound transmitting means and ultrasound receiving means.

In the inventive system for delivering data to a user the transmitting means can include a speaker provided in the portable electronic apparatus, while the receiving means can include a microphone provided in the electronic device of the beverage container.

In the system for delivering data to a user the portable electronic apparatus and the electronic device of the beverage container can be configured to transmit and to display the data in form of a text on the electronic display of the electronic device of said beverage container.

In the inventive system for delivering data to a user in accordance with the invention wherein the portable electronic apparatus and said electronic device of the beverage container can be configured to transmit and to produce in the electronic device of the beverage container the messages selected from the group consisting of video messages, audio messages and both.

The portable electronic apparatus and the electronic device of the beverage container of the inventive system can be configured to activate in the electronic device messages selected from the group consisting of messages which are preliminarily stored in the electronic device of the beverage container, messages which are transmitted to the electronic device of the beverage container, and both.

The novel features of the present invention are set forth in particular in the appended claims. The invention itself, however, both as to its construction and its manner of operation, will be best understood from the following description of the preferred embodiments, which is accompanied by the following drawings.

DESCRIPTION OF THE PREFERRED EMBODIMENTS

Figure 1:
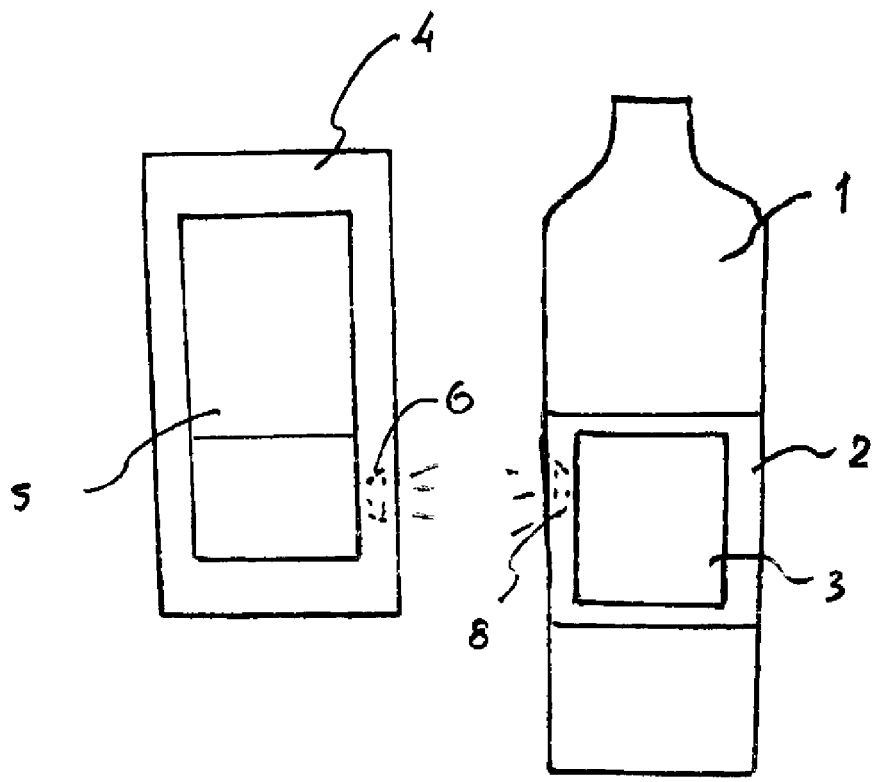
FIG. 1 of the drawings is a view showing a system for delivering data to users with its main components in accordance with the present invention.
Figure 2:
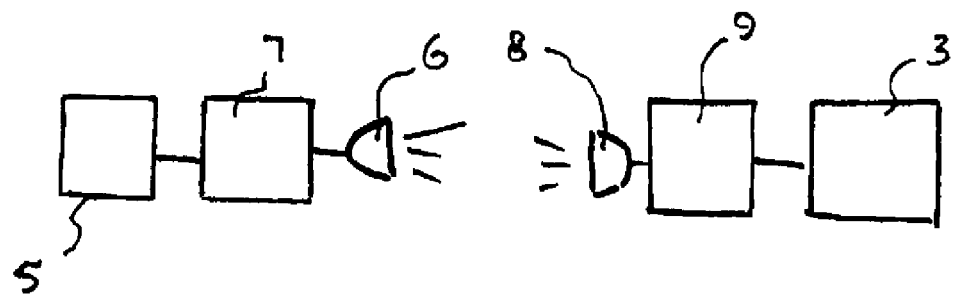
FIG. 2 of the drawings is a view schematically showing an electronic circuit of the inventive system for delivering data to users.

A system for delivering data to users in accordance with the present invention includes a container or bottle for beverages which is identified as a whole with reference numeral 1. The beverage container 1 has walls which limit an inner space for accommodating a beverage.

The beverage container 1 further has an electronic device which is identified with reference numeral 2. The electronic device 2 has an electronic display 3 for displaying video images, for example a text. For this purpose the electronic display 3 has, for example, a plurality of light emitting elements such as for example LEDs, OLEDs etc. Such beverage containers are known in the art and disclosed, for example, in the above mentioned patents and patent applications, which are incorporated here by references thereto.

The system in accordance with the present invention further has a portable electronic apparatus, such as an electronic mobile phone or an electronic tablet, as identified with reference numeral 4. The portable electronic apparatus 4 has data providing means 5, with which a user holding the portable electronic apparatus 4 in his or her hands can composed corresponding data, for example a text. The data providing means 5 can be formed as a keyboard, a touch screen, etc.

The portable electronic apparatus 4 has data transmitting means 6 which transmit the data composed by a user to the electronic device 2 with the use of ultra-sound, or in other words, with ultra-sonic frequency, so that the thusly transmitted data are exhibited on the electronic display 3 of the electronic device 2 of the beverage container 1.

With the inventive system, for the first time a user of the system can stand in the vicinity, for example in front of the beverage bottle 1, operate the electronic mobile phone or the electronic tablet 4 to compose for example a text, and the text will be transmitted via ultra-sound to the beverage container 1 and exhibited on the electronic display 3 of the beverage container 1, as shown in FIG. 1, so that it can be seen by the user herself or himself during this process and also by other people in the vicinity of the beverage container 1.

For operating in the above explained manner, the portable electronic device 4 can have a microprocessor 7 which processes the data provided by the data providing means 5 and provides transmission of the data via ultra-sound by the data transmitting means 6 formed, for example, as a speaker. Receiving means 8 of the electronic device 2 in the beverage container 1, formed for example as a microphone receive the data transmitted this way, and a microprocessor 9 of the electronic device 2 of the beverage container 1 processes the data and send the data to the electronic display 3, which exhibits the data, for example as a text.

It is conceivable in accordance with the present invention, that the system allows transmission, reception, and delivery of other video images as well. It is also possible that the system allows transmission, reception and delivery of audio messages as well. Also in the inventive system it is possible to activate in the electronic device of the beverage container preliminarily stored video images, audio messages, or both, or to compose, transmit, receive, and deliver the same live, continuously or intermittently.

The invention is not limited to the details shown since various modifications and structural changes are possible without departing in any way from the spirit of the invention.

The invention claimed is:

1. A system, comprising
   a portable electronic apparatus, selected from the group consisting of an electronic mobile phone and an electronic tablet, the portable electronic apparatus comprising:
     an input mechanism comprising at least one of a touchscreen or a keyboard, wherein the input mechanism is to receive user input comprising a composition of a text message;
     a first processor to process data including the text message; and
     a first ultrasonic module comprising an ultrasonic transmitter to generate an ultrasound signal from the data including the text message and to remotely transmit the ultrasound signal comprising the data including the text message to an ultrasonic receiver of an electronic device of a beverage container; and
   the beverage container, comprising:
     one or more walls that limit an inner space of the container for accommodating a beverage;
     the electronic device, attached to the one or more walls, wherein said electronic device comprises:
       a second ultrasound module comprising the ultrasonic receiver, wherein the ultrasonic receiver is to receive the ultrasound signal comprising the data including the text message and the second ultrasound module is to output the data including the text message to a second processor of the electronic device;
       the second processor to receive the data including the text message and to provide the data including the text message to an electronic display of the electronic device; and
       the electronic display to electronically display on said electronic display the text message of the data received by said ultrasonic receiver, wherein the electronic display comprises at least one of a plurality of light emitting diodes or a plurality of organic light emitting diodes to display the text message.

2. A system for delivering data to a user as defined in claim 1, wherein said ultrasonic transmitter comprises a speaker provided in said portable electronic apparatus, and said ultrasonic receiver comprises a microphone provided in said electronic device of said beverage container.

3. A system for delivering data to a user as defined in claim 1, wherein said
   data further includes at least one of video messages or audio messages.

4. A system for delivering data to a user as defined in claim 1, wherein:
   said portable electronic apparatus is further to generate additional data comprising an instruction to activate in said electronic device of said beverage bottle an additional text message previously stored in a memory of said electronic device, and to directly send the additional data via an additional ultrasound signal from the ultrasonic transmitter of the portable electronic apparatus to the ultrasonic receiver of the electronic device, wherein the additional data is sent from the portable electronic apparatus to the electronic device without travelling through any additional intermediary devices; and
   said electronic device is further to output the additional text message previously stored in the memory of the electronic device on at least one of the plurality of light emitting diodes or the plurality of organic light emitting diodes responsive to receipt of the additional data comprising the instruction.

* * * * *